(12) United States Patent
Lee et al.

(10) Patent No.: US 8,000,549 B2
(45) Date of Patent: Aug. 16, 2011

(54) DIGITAL IMAGE PROCESSING APPARATUS AND METHOD FOR THE SAME

(75) Inventors: Chuan-Hsin Lee, HsinChu (TW); Tzu-Yi Chao, HsinChu (TW); Hsin-Chia Chen, HsinChu (TW)

(73) Assignee: PixArt Imaging Incorporation, Hsin-Chu (TW)

( * ) Notice: Subject to any disclaimer, the term of this patent is extended or adjusted under 35 U.S.C. 154(b) by 1360 days.

(21) Appl. No.: 11/510,979

(22) Filed: Aug. 28, 2006

(65) Prior Publication Data

US 2007/0201759 A1 Aug. 30, 2007

(30) Foreign Application Priority Data

Feb. 24, 2006 (TW) .............................. 95106359 A

(51) Int. Cl.
*G06K 9/40* (2006.01)
*H04N 5/208* (2006.01)

(52) U.S. Cl. ....... 382/254; 382/260; 358/3.27; 358/532; 348/252; 348/606; 348/626

(58) Field of Classification Search .................. 382/254, 382/260–275; 348/252, 606, 625; 358/3.27, 358/532
See application file for complete search history.

(56) References Cited

U.S. PATENT DOCUMENTS

| | | | | |
|---|---|---|---|---|
| 4,520,505 A | * | 5/1985 | Yamamoto et al. | 382/258 |
| 4,691,366 A | * | 9/1987 | Fenster et al. | 382/266 |
| 4,783,840 A | * | 11/1988 | Song | 382/261 |
| 4,825,297 A | * | 4/1989 | Fuchsberger et al. | 358/447 |
| 5,003,618 A | * | 3/1991 | Meno | 382/261 |
| 5,031,227 A | * | 7/1991 | Raasch et al. | 382/199 |
| 5,038,388 A | * | 8/1991 | Song | 382/266 |
| 5,054,100 A | * | 10/1991 | Tai | 382/300 |
| 5,091,972 A | * | 2/1992 | Kwon et al. | 382/277 |
| 5,271,064 A | * | 12/1993 | Dhawan et al. | 382/266 |
| 5,339,170 A | * | 8/1994 | Fan | 358/3.08 |
| 5,351,305 A | * | 9/1994 | Wood et al. | 382/128 |
| 5,416,855 A | * | 5/1995 | Geiger | 382/254 |
| 5,436,980 A | * | 7/1995 | Weeks et al. | 382/141 |
| 5,457,546 A | * | 10/1995 | Hong | 358/447 |
| 5,559,902 A | * | 9/1996 | Bose et al. | 382/263 |
| 5,649,031 A | * | 7/1997 | Nakamura et al. | 382/254 |
| 5,825,937 A | * | 10/1998 | Ohuchi et al. | 382/261 |
| 5,933,540 A | * | 8/1999 | Lakshminarayanan et al. | 382/260 |
| 5,946,454 A | * | 8/1999 | Shu et al. | 358/1.9 |
| 6,201,879 B1 | * | 3/2001 | Bender et al. | 382/100 |
| 6,229,923 B1 | * | 5/2001 | Williams et al. | 382/224 |

(Continued)

FOREIGN PATENT DOCUMENTS

JP 200057336 A 2/2000

(Continued)

*Primary Examiner* — Manav Seth
(74) *Attorney, Agent, or Firm* — Tung & Associates

(57) ABSTRACT

A digital image processing method is disclosed, which comprises the steps of: (A) capturing a digital image; (B) selecting at least a target pixel within the digital image according to a predetermined rule; (C) performing a first filtering on a graphic region including the target pixel and its neighboring pixels within the digital image, to generate a set of first filtered values; and (D) performing a second filtering on the set of first filtered values to generate a set of second filtered values, and performing a digital image adjustment process on the digital image according to the set of second filtered values.

14 Claims, 6 Drawing Sheets

U.S. PATENT DOCUMENTS

| | | | |
|---|---|---|---|
| 6,665,447 B1 * | 12/2003 | Chan | 382/254 |
| 6,721,457 B1 * | 4/2004 | Atkins et al. | 382/260 |
| 6,847,738 B1 * | 1/2005 | Scognamiglio et al. | 382/260 |
| 7,110,599 B1 * | 9/2006 | Moriya et al. | 382/170 |
| 7,463,784 B2 * | 12/2008 | Kugo | 382/263 |
| 7,471,320 B2 * | 12/2008 | Malkin et al. | 348/252 |
| 2005/0169514 A1 * | 8/2005 | Prince | 382/150 |
| 2006/0245637 A1 * | 11/2006 | Prince | 382/150 |
| 2008/0152222 A1 * | 6/2008 | Takeuchi | 382/167 |

FOREIGN PATENT DOCUMENTS

| | | |
|---|---|---|
| TW | 595213 | 6/2004 |

* cited by examiner

DIGITAL IMAGE PROCESSING APPARATUS AND METHOD FOR THE SAME

BACKGROUND OF THE INVENTION

1. Field of the Invention

The present invention relates to a digital image processing apparatus and a method for the same, in particular to a digital image processing apparatus capable of providing increased image sharpness with reduced noises, and a method for the same.

2. Description of the Related Art

Typically, the quality of an image shown by a display apparatus may be improved by adjusting its contrast, brightness, hue or sharpness.

The sharpness of an image is decided by the clearness of the boundary between bright and dark areas. In most cases, the boundary between bright and dark areas is the high-frequency part of video signals. If, during processing sensed video signals, the high-frequency part of the video signals is somewhat lost or distorted, the resulted display image would be blurred and illegible at the boundary between bright and dark areas.

A typical method for sharpening an image is edge enhancement. The method uses Laplacian or Sobel high-pass filter to detect edges of an image, and to enhance the detected edges. Relevant hardware implementations for edge detection and enhancement operations have been proposed, such as U.S. Pat. No. 6,404,460 an U.S. Pat. No. 6,441,866.

However, because both noises and the boundary between bright and dark areas belong to high-frequency domain, the high-pass filtering in the conventional image edge enhancement method increases both the sharpness and the noises in an image, if information at the edges of an image is not taken into particular consideration.

SUMMARY OF THE INVENTION

In view of the foregoing, it is an object of the present invention to provide a digital image processing apparatus capable of providing increased image sharpness with reduced noises, and a method for the same.

A digital image processing method according to the present invention comprises: (A) capturing a digital image; (B) selecting at least a target pixel within the digital image according to a predetermined rule; (C) performing a first filtering on a graphic region including the target pixel and its neighboring pixels within the digital image, to generate a set of first filtered values; and (D) performing a second filtering on the set of first filtered values to generate a set of second filtered values, and performing a digital image adjustment process on the digital image according to the set of second filtered values.

An electronic apparatus for processing a digital image according to the present invention comprises: an image sensor for capturing a digital image; and an image enhancement and noise suppression module for selectively providing either an image enhancement function or a noise suppression function on said digital image.

According to another aspect of the present invention, an electronic apparatus for processing a digital image according to the present invention comprises an image enhancement and noise suppression module, the image enhancement and noise suppression module including: a first filter unit, a memory unit, a pre-processing unit, a sharpness control unit, a noise suppression control unit, a comparator, a selection unit, and a post-processing unit.

The first filter unit performs a first filtering on a graphic region within the digital image to generate a set of first filtered values, the graphic region including a target pixel and its neighboring pixels. The memory unit stores the set of first filtered values of the graphic region. The pre-processing unit is electrically coupled to the memory unit for calculating a set of second filtered values for the target pixel and the neighboring pixels within the graphic region, and generating a summation value according to the differences between the second filtered values. The sharpness control unit is electrically coupled to the pre-processing unit for receiving and adjusting the summation value to generate a sharpness enhancement value. The noise suppression control unit is electrically coupled to the memory unit for generating a noise suppression value according to a brightness value and the first filtered value of the target pixel.

The selection unit is electrically coupled to the sharpness control unit and the noise suppression control unit for selecting one of the sharpness enhancement value and the noise suppression value. The comparator is electrically coupled to the selection unit and the sharpness control unit for comparing the sharpness enhancement value with a sharpness enhancement threshold and controlling the selection by the selection unit according to the result of comparison. The post-processing unit is electrically coupled to the selection unit for performing image sharpness enhancement according to the sharpness enhancement value or noise suppression according to the noise suppression value, depending on the output from the selection unit.

DESCRIPTION OF THE PREFERRED EMBODIMENT

The abovementioned and other objects, characteristics, and effects of the present invention may be more clearly understood from the detailed description of the preferred embodiments below, with reference to the attached drawings.

Figure 1:
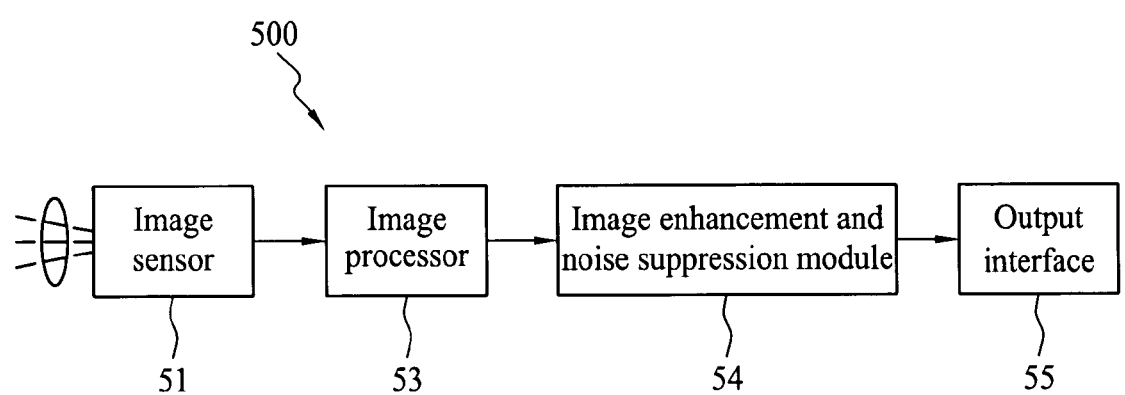
FIG. 1 is a circuit block diagram schematically showing an electronic apparatus employing the digital image processing method according to a preferred embodiment of the present invention.

As shown in FIG. 1, which is a preferred embodiment of an electronic apparatus 500 according to the present invention, the electronic apparatus 500 comprises an image sensor 51, an image processor 53, an image enhancement and noise suppression module 54, and an output interface 55. The electronic apparatus 500 may for example be, but not limited to, an image capturing apparatus such as a digital camera, a digital video recorder, or the like.

The image sensor 51 of the electronic apparatus 500 is a CCD or CMOS image sensor having a plurality of pixel arrays for sensing the reflected light from an object (not shown) and outputting a digital image. The image processor 53 receives the digital image and selects at least a target pixel within the digital image according to a predetermined rule. In the present preferred embodiment, the rule is to sequentially read each pixel within the digital image, array by array. The output of the image processor 53 is sent to the image enhancement and noise suppression module 54 for image enhancement and noise suppression processing. The output interface 55 is for outputting the processed image information from the image enhancement and noise suppression module 54 through, e.g., a USB interface, to, e.g., a personal computer.

Figure 2:
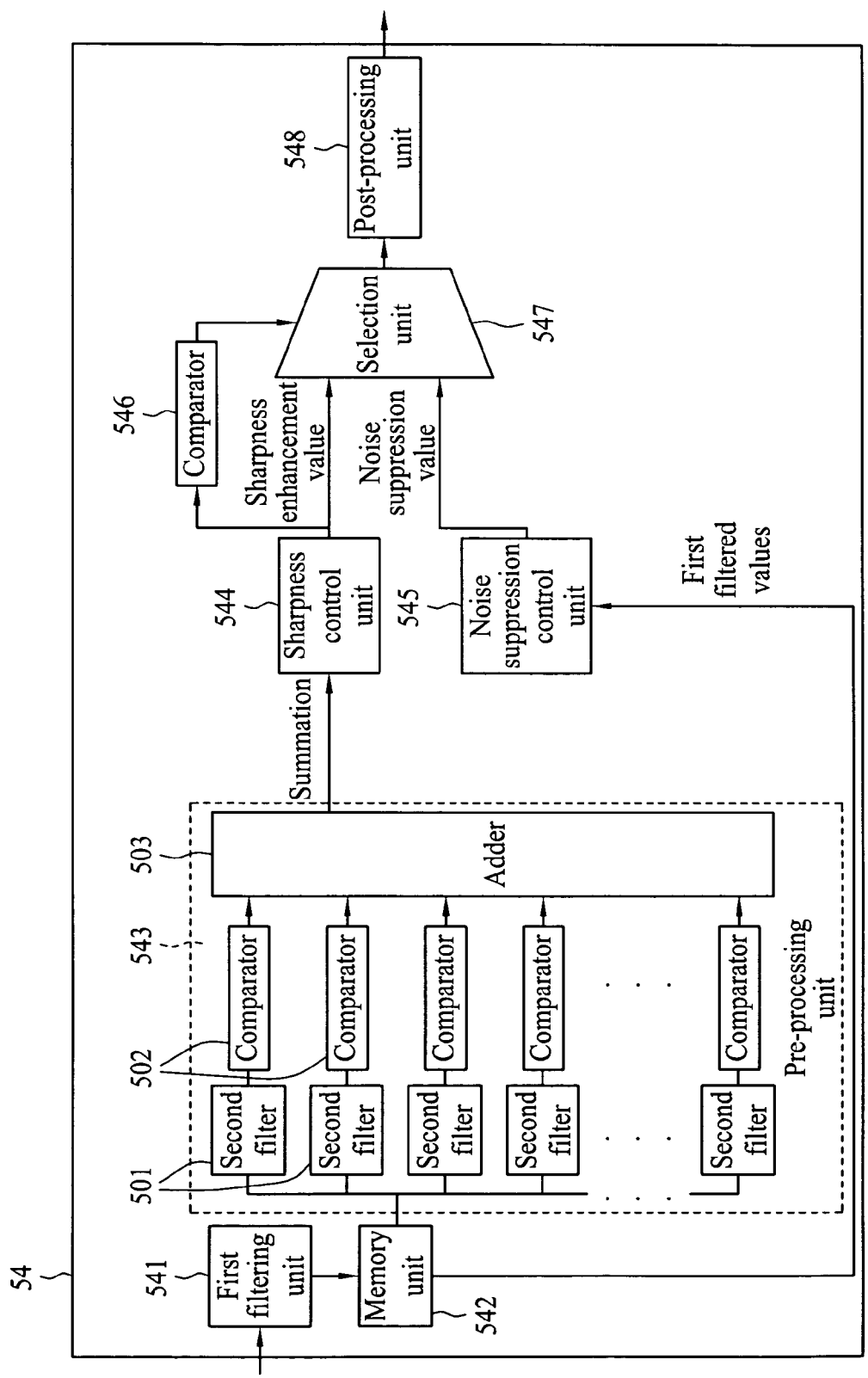
FIG. 2 is a circuit block diagram schematically showing the detailed structure of the image enhancement and noise suppression module in the preferred embodiment shown in FIG. 1.

As shown in FIG. 2, the image enhancement and noise suppression module 54 receives the target pixel information from the image processor 53, and performs image enhancement and noise suppression function on a graphic region comprising the target pixel (i.e., an area within the digital image which comprises the target pixel). The image enhancement and noise suppression module 54 comprises a first filter unit 541, a memory unit 542, a pre-processing unit 543, a sharpness control unit 544, a noise suppression control unit 545, a comparator 546, a selection unit 547, and a post-processing unit 548.

The function of each unit is as follows.

The first filter unit 541 performs a first filtering on at least a graphic region of the received digital image to generate a set of first filtered values. The first filtering in the present preferred embodiment may be, but not limited to, low-pass filtering. The set of first filtered values is stored in the memory unit 542.

The memory unit 542 stores the set of first filtered values to be further processed by the pre-processing unit 543 and the noise suppression control unit 545.

The pre-processing unit 543 includes a plurality of second filters 501, a plurality of comparators 502, and an adder 503. There are eight second filters 501 and eight comparators 502 in the shown embodiment (note that, however, the number is illustrative rather than limiting); each second filter 501 is electrically connected with a corresponding comparator 502, and all the comparators 502 are electrically connected with the adder 503.

In the present preferred embodiment, the pre-processing unit 543 performs a second filtering function on the first filtered values of the target pixel and its neighboring pixels, to generate a set of second filtered values. The second filtering in the present preferred embodiment may be, but not limited to, high-pass filtering. According to the present preferred embodiment, the set of second filtered values is a set of differences between the first filtered value of the target pixel and the first filtered values of neighboring pixels.

According to the present preferred embodiment, the neighboring pixels are the eight pixels surrounding the target pixel in eight directions, but could be less or more than eight in another embodiment. The set of second filtered values in the present preferred embodiment may be, but not limited to, a result by calculating the differences between the first filtered values of the target pixel and the neighboring pixels in all directions. The set of second filtered values obtained by the calculation may be used for further digital image processing on the target pixel; the digital image processing may be either or both of sharpness enhancement and noise suppression.

Each comparator 502 determines whether the abovementioned difference is larger than a threshold. If not, the difference is not provided to the adder 503. If yes, the difference is provided to the adder 503, and a summation value, i.e., a total of all outputs from the comparators 502, is generated.

Sharpness enhancement and noise suppression are done as thus: the sharpness control unit 544 limits and adjusts the summation value outputted from the pre-processing unit 543 to generate an adjusted sharpness enhancement value. The sharpness enhancement value is outputted to the comparator 546 and the selection unit 547. The sharpness enhancement value outputted from the sharpness control unit 544 is provided to the comparator 546 as a basis for determination of whether to process image enhancement or noise suppression.

As a preferred example, the comparator 546 compares the sharpness enhancement value with a sharpness enhancement threshold. If the sharpness enhancement value is larger than the sharpness enhancement threshold, the comparator 546 outputs 1; if the sharpness enhancement value is not larger than the sharpness enhancement threshold, the comparator 546 outputs 0. The selection unit 547 determines whether to output the sharpness enhancement value or the noise suppression value (to be described below) to the post-processing unit 548 based on the output (1 or 0) from the comparator 546. The post-processing unit 548 compensates each target pixel by the sharpness enhancement value or the noise suppression value.

The function of the noise suppressing control unit 545 is to multiply the difference between the first filtered value and the brightness value of the target pixel by an adjusting parameter, to generate a noise suppression value.

The post-processing unit 548 performs an image sharpness enhancement process or a noise suppression process. In the image sharpness enhancement process, the post-processing unit 548 adds the sharpness enhancement value, which is used as a compensation factor, onto the original brightness value of the target pixel. In the noise suppression process, similar to the image sharpness enhancement process, the post-processing unit 548 adds the noise suppression value, which is used as a compensation factor, onto the original brightness value of the target pixel. According to the present preferred embodiment, the noise suppressing control unit 545 multiplies the difference between the first filtered value and the brightness value of the target pixel by an adjusting parameter, to generate the noise suppression value.

It should be noted that the abovementioned method for improving image sharpness with reduced noises according to the present invention does not necessarily have to be implemented by hardware. Alternatively, it may be implemented in a computer-readable device which includes a program that may be loaded into a computer. The program cooperates with corresponding hardware and software in the electronic apparatus to read a digital image and process pixels within the digital image.

Figure 3:
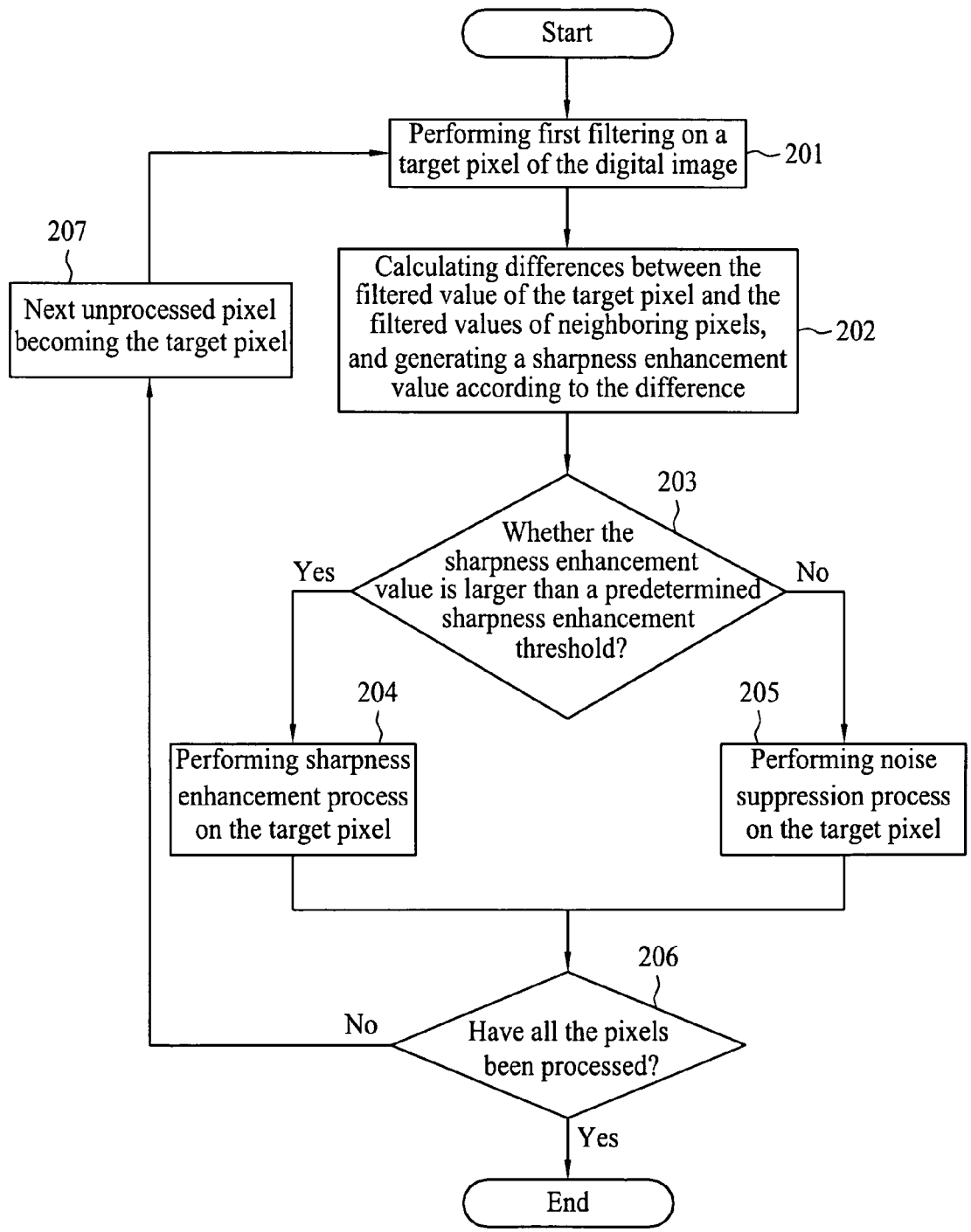
FIG. 3 is a flow chart showing the steps of the digital image processing method according to the present invention.

FIG. 3 shows the steps of the digital image processing method for improving image sharpness with reduced noises according to the present invention.

First, a digital image is captured, and at least one target pixel within the digital image is selected according to a predetermined rule. The rule may be, e.g., sequentially selecting each pixel, array by array. Next, a first filtering is performed on the digital image (step 201). After the first filtering, a difference between the filtered value of the target pixel and the filtered value of each neighboring pixel is generated, and a sharpness enhancement value is obtained (step 202; the details of the step 202 will be further explained with reference to FIG. 4 hereinafter).

After the sharpness enhancement value is obtained, a judgment is made as to whether the absolute value of the sharpness enhancement value is larger than a predetermined sharpness enhancement threshold (step 203). If it is determined that the sharpness enhancement value is larger than the predetermined sharpness enhancement threshold, then a sharpness enhancement process is performed on the target pixel (step 204). If it is determined that the sharpness enhancement value is not larger than the predetermined sharpness enhancement threshold, then a noise suppression process is performed on the target pixel (step 205).

Thereafter, a judgment is made as to whether all of the pixels have been processed (step 206). If not, a next unprocessed pixel within the digital image becomes the target pixel (step 207). Thus, steps 201-205 are repeated for every pixel within the digital image, until all of the pixels have been processed.

Figures 5, 6:
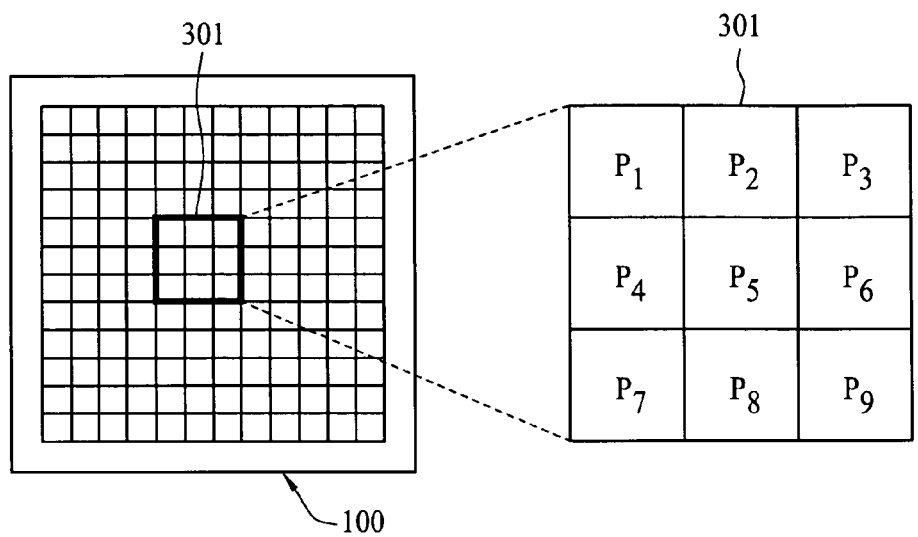
FIG. 5 schematically shows that an original graphic region is taken from a digital image for further processing.
FIG. 6 schematically shows that the original graphic region in FIG. 5 is subject to a first filtering.
Figure 7:
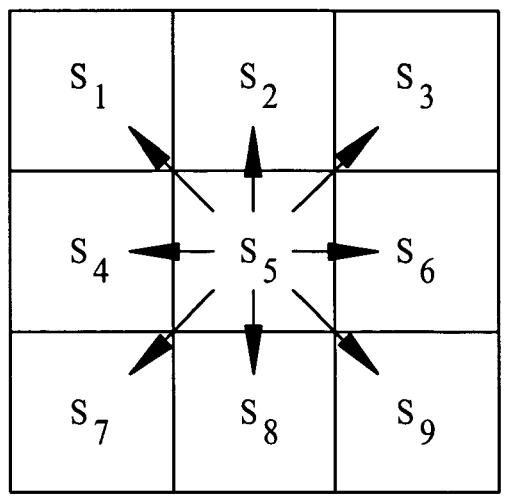
FIG. 7 schematically shows that the result of FIG. 6 is subject to an eight-directional filtering.

FIGS. 5-7 explain how to perform the first filtering and the second filtering on a digital image 100.

As shown in FIG. 5, an original graphic region 301 is taken from the digital image 100. According to the present preferred embodiment, the graphic region 301 includes a target pixel $P_5$, and its eight neighboring pixels $P_1$-$P_4$ and $P_6$-$P_9$.

As shown in FIGS. 5 and 6, the original graphic region 301 taken from the digital image 100 includes a target pixel $P_5$ to be processed, and its eight neighboring pixels $P_1$-$P_4$ and $P_6$-$P_9$. After a first filtering, a first filtered value $S_5$ of the target pixel $P_5$ is obtained. Similarly, using each of the pixels $P_1$-$P_4$ and $P_6$-$P_9$ as a target pixel, and the eight neighboring pixels of each of the pixels $P_1$-$P_4$ and $P_6$-$P_9$, the first filtered values $S_1$-$S_4$ and $S_6$-$S_9$ of the pixels $P_1$-$P_4$ and $P_6$-$P_9$ are respectively obtained. In other words, the original graphic region 301 is subject to a first filtering process to obtain a first filtered result 303.

According to the present preferred embodiment, the first filtering is done by means of a 3×3 Gaussian low-pass filter mask 302. An operation is made between the numbers in the mask 302 and the original brightness values of the pixels $P_1$-$P_9$ in the original graphic region 301, to obtain the first filtered value, as the following equation (1):

$$S_5 = \frac{P_1 + 2P_2 + P_3 + 2P_4 + 4P_5 + 2P_6 + P_7 + 2P_8 + P_9}{16} \quad \text{Eq. (1)}$$

It should be noted that the Gaussian low-pass filter is only one of many possible alternatives. One may use other low-pass filters to achieve the purpose of filtering.

It should also be noted that, according to the present preferred embodiment, the first filtered values $S_1$-$S_4$ and $S_6$-$S_9$ of the pixels $P_1$-$P_4$ and $P_6$-$P_9$ are also obtained. In later process steps, the use of these first filtered values of the eight neighboring pixels provides a more effective estimation of image edges than the use the brightness values of these pixels.

As shown in FIG. 7, a second filtering is performed according to the present preferred embodiment, which is to calculate the differences between the first filtered value $S_5$ of the target pixel and the first filtered values $S_1$-$S_4$ and $S_6$-$S_9$ of the neighboring pixels, and to calculate an absolute value for each difference $\Delta xi$ between the first filtered value $S_5$ and each first filtered value $S_i$ of the neighboring pixels according to the following equation (2):

$$|\Delta xi| = x \text{ if } x \geq 0$$

$$|\Delta xi| = -x \text{ if } x < 0 \quad \text{Eq. (2)}$$

Next, a sharpness enhancement value is generated according to the differences, which will be explained with reference to the steps shown in FIG. 4.

Figure 4:
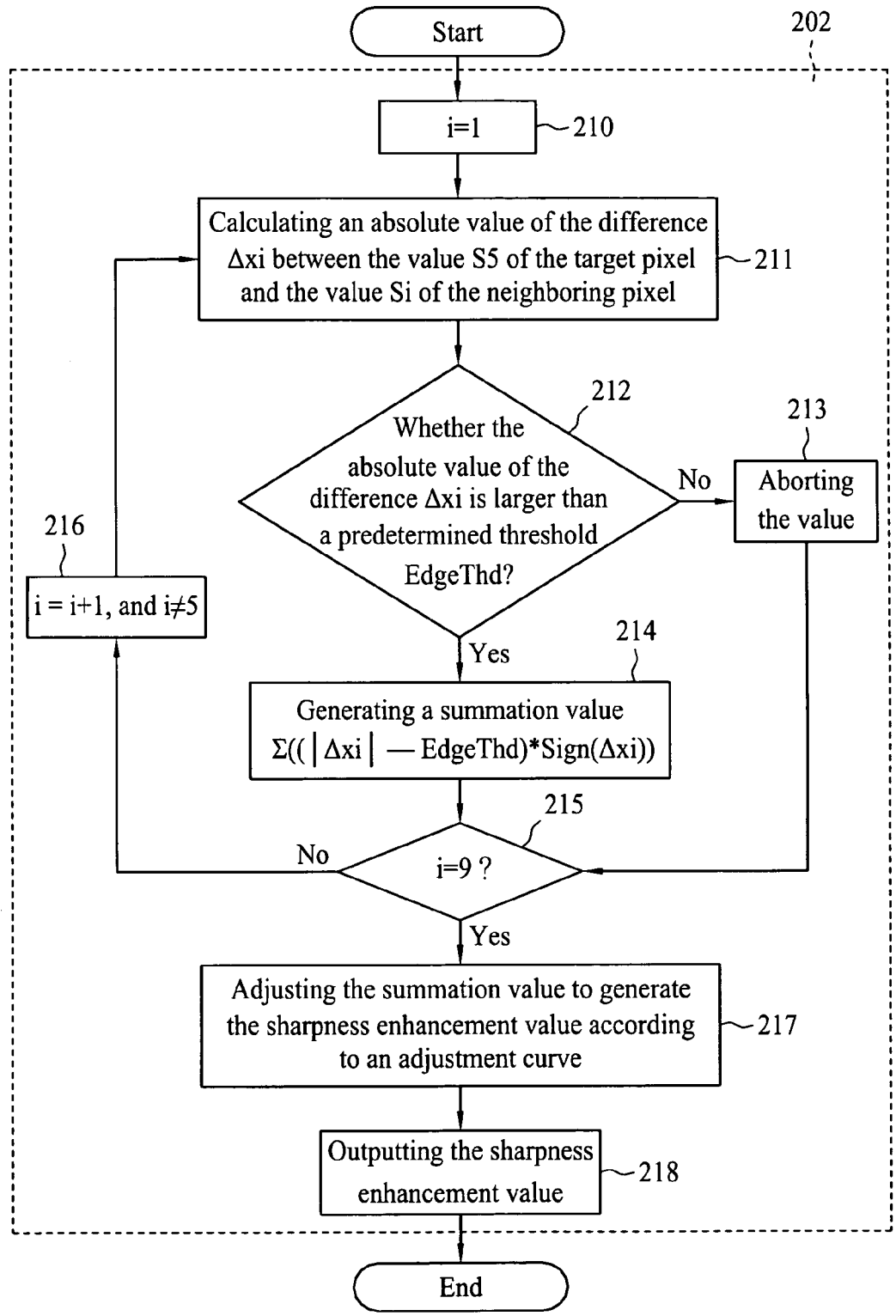
FIG. 4 is a flow chart showing the detailed steps of the step 202 shown in FIG. 3.

FIG. 4 shows the steps for generating the sharpness enhancement value in the digital image processing method according to the present invention, in which it is assumed that the number of pixels to be processed is 9 (in a graphic region), and $S_i$ (i=1~9) stands for the values of the pixels to be processed.

First, in step 201, the value $S_1$ of the first pixel is picked up (i=1), and an absolute value of the difference $\Delta xi$ between the value $S_5$ and the value $S_i$ of the neighboring pixel $S_i$ is calculated according to the equation (2) (step 211), and a judgment is made as to whether the absolute value of the difference $\Delta xi$ is larger than a predetermined threshold EdgeThd (step 212)?

If not, the absolute value is aborted (step 213); if yes, the absolute value is outputted to the adder 503 to generate a summation value $\Sigma((|\Delta xi|-\text{EdgeThd})*\text{Sign}(\Delta xi))$ (step 214). Sign($\Delta xi$) is obtained by the following equation (3):

$$\text{Sign}(\Delta xi)=1 \text{ if } x \geq 0$$

$$\text{Sign}(\Delta xi)=-1 \text{ if } x < 0 \quad \text{Eq. (3)}$$

Next, a judgment is made as to whether all the values of the pixels have been processed, i.e., whether i=9 (step 215)? If not, then i=i+1 and i≠5 (step 216), and the steps 211-215 are repeated for the next pixel, until i=9. If yes, i.e., when i=9, the sharpness control unit 544 adjusts the summation $\Sigma((|\Delta xi|-\text{EdgeThd})*\text{Sign}(\Delta xi))$ according to an adjustment curve, to generate an adjusted sharpness enhancement value (step 217). Finally, the sharpness enhancement value is outputted (step 218).

Figure 8:
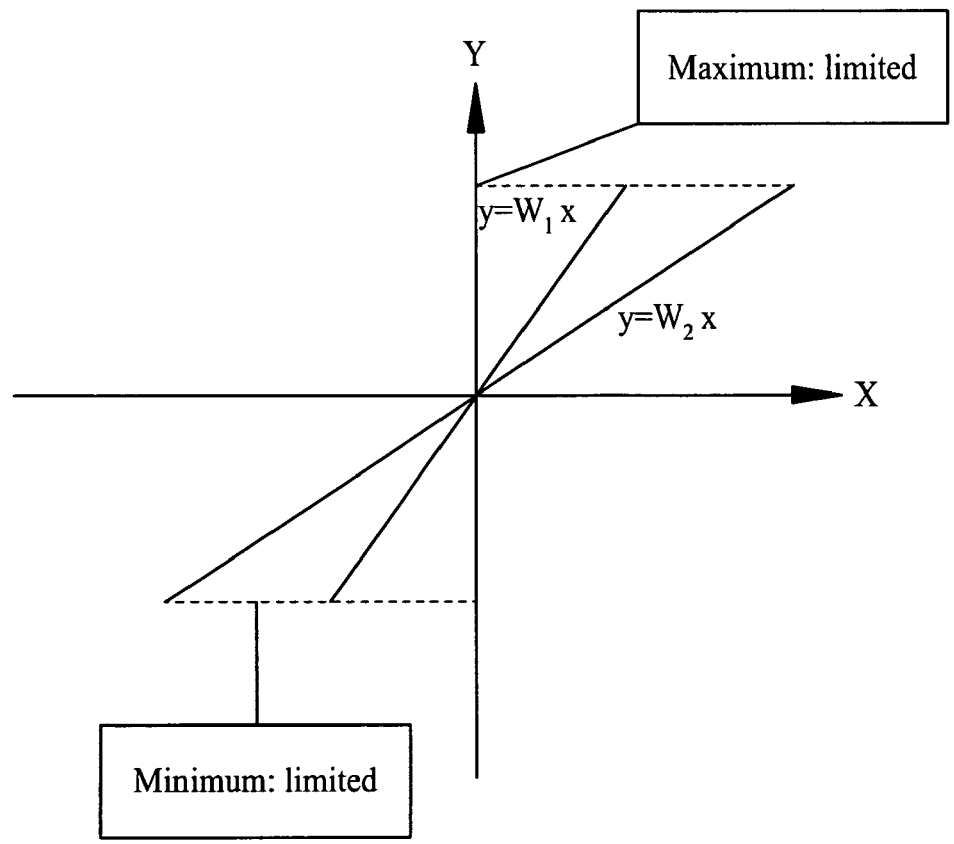
FIG. 8 explains the correspondence between the summation value and the enhancement value.

FIG. 8 explains how the adjustment is made based on the adjustment curve. The X coordinate represents the summation value (DIFF), and the Y coordinate represents the corresponding sharpness enhancement value (EnhanceValue), the relation between the summation value and the sharpness enhancement value is a linear relation y=wx. The larger the slope w is (e.g., y=$W_1$x). the sharpness enhancement is stronger; the smaller the slope w is (e.g., y=$W_2$x). the sharpness enhancement is weaker.

To avoid overly sharpening an image, a boundary is given so that the sharpness enhancement value is limited between a maximum value (EnhanceValueUB) and a minimum value (EnhanceValueLB), as follows:

```
IF( EnhanceValue > EnhanceValueUB )
    EnhanceValue = EnhanceValueUB;
IF( EnhanceValue < EnhanceValueLB )
    EnhanceValue = EnhanceValueLB;
``` in which EnhanceValueUB is a maximum and EnhanceValueLB is a minimum.

In summary, the digital image processing apparatus and method according to the present invention, which are capable of providing increased image sharpness with reduced noises, have the following advantages as compared with the prior art:

First, in the present invention, the target pixel is first filtered; the filtered values of the target pixel and its neighboring pixels are filtered for a second time; the second filtered values are added and adjusted to generate a sharpness enhancement value; and a threshold is provided to determine whether the target pixel is required to be subject to an image enhancement process or a noise suppression process. Thus, an image edge may be effectively detected (in particular to such edge which is directional), and the present invention overcomes the drawback in the prior art that, due to not being able to distinguish between a noise and an image edge, the contrast at an image edge and the contrast of a noise are both increased to degrade the quality of an image.

Second, in the circuit arrangement according to the present invention, it is not required to provide an additional noise suppression circuit. The image enhancement and noise suppression functions are both achieved by one circuit part, the image enhancement and noise suppression module. In the image enhancement and noise suppression module, a comparator 546 compares the sharpness enhancement value with a sharpness enhancement threshold. If the sharpness enhancement value is larger than the sharpness enhancement threshold, the sharpness enhancement process is taken; if the sharpness enhancement value is not larger than the sharpness enhancement threshold, the noise suppression process is taken. The post-processor 548 is commonly used in both processes; it compensates the brightness value of the pixel according to the sharpness enhancement value from the sharpness control unit 544 or the noise suppression value from the noise suppression control unit 545. The noise suppression value may be obtained from the first filtered values stored in the memory unit 542, without additional complex circuit parts. Therefore, hardware cost and complexity are reduced.

The features, characteristics and effects of the present invention have been described with reference to its preferred embodiments, which are illustrative of the invention rather than limiting of the invention. Various other substitutions and modifications will occur to those skilled in the art, without departing from the spirit of the present invention. For example, the image enhancement and noise suppression module 54 may be embedded in the processor 53 as an integrated circuit, instead of two separate circuit parts. Therefore, all such substitutions and modifications are intended to be embraced within the scope of the invention as defined in the appended claims.

What is claimed is:

1. A digital image processing method, comprising the steps of:
   (A) capturing a digital image;
   (B) selecting at least a target pixel within said digital image according to a predetermined rule;
   (C) performing a first filtering on a graphic region including said target pixel and its neighboring pixels within said digital image, to generate a set of first filtered values;
   (D) performing a second filtering on said set of first filtered values to generate a set of second filtered values, and performing a digital image adjustment process on said digital image according to said set of second filtered values; and
   (E) generating a sharpness enhancement value according to said second filtered values, and determining whether said sharpness enhancement value is larger than a predetermined sharpness enhancement threshold;
   (F) if said sharpness enhancement value is larger than said predetermined sharpness enhancement threshold, using said sharpness enhancement value to perform an image sharpness enhancement process on said target pixel; and
   (G) if said sharpness enhancement value is not larger than said predetermined sharpness enhancement threshold, performing a noise suppression process on said target pixel.

2. The digital image processing method according to claim 1, wherein said first filtering is low-pass filtering.

3. The digital image processing method according to claim 1, wherein said second filtering is high-pass filtering.

4. The digital image processing method according to claim 1, wherein said digital image adjustment process includes one of a sharpness enhancement process and a noise suppression process.

5. The digital image processing method according to claim 1, wherein said set of second filtered values is a set of differences between said first filtered value of said target pixel and said first filtered values of said neighboring pixels.

6. The digital image processing method according to claim 1, wherein said neighboring pixels are pixels surrounding said target pixel.

7. The digital image processing method according to claim 1, wherein said step (E) includes: determining whether each of said second filtered values is larger than a predetermined threshold; adding every said second filtered value which is larger than said predetermined threshold together to generate a summation value; and adjusting said summation value to result in said sharpness enhancement value according to an adjustment curve.

8. The digital image processing method according to claim 7, wherein said adjustment curve provides a linear adjustment according to the equation $y=wx$, wherein w is a controllable parameter.

9. The digital image processing method according to claim 1, wherein said image sharpness enhancement process in step (F) includes: adding said sharpness enhancement value to an original brightness value of said target pixel.

10. The digital image processing method according to claim 1, wherein said noise suppression process in step (G) includes: multiplying a difference between said first filtered value and a brightness value of said target pixel by an adjusting parameter, to generate a noise suppression value; and adding said noise suppression value to an original brightness value of said target pixel.

11. An electronic apparatus for processing a digital image, comprising an image enhancement and noise suppression module, wherein said image enhancement and noise suppression module includes:

a first filter unit for performing a first filtering on a graphic region within said digital image to generate a set of first filtered values, said graphic region including a target pixel and its neighboring pixels;

a memory unit for storing said set of first filtered values of said graphic region;

a pre-processing unit electrically coupled to said memory unit for calculating a set of second filtered values for said target pixel and said neighboring pixels within said graphic region, and generating a summation value according to the differences between said second filtered values;

a sharpness control unit electrically coupled to said pre-processing unit for receiving and adjusting said summation value to generate a sharpness enhancement value;

a noise suppression control unit electrically coupled to said memory unit for generating a noise suppression value according to a brightness value and the first filtered value of said target pixel;

a selection unit electrically coupled to said sharpness control unit and said noise suppression control unit for selecting one of said sharpness enhancement value and said noise suppression value;

a comparator electrically coupled to said selection unit and said sharpness control unit for comparing said sharpness enhancement value with a sharpness enhancement threshold and controlling the selection by said selection unit according to the result of comparison; and a post-processing unit electrically coupled to said selection unit for performing image sharpness enhancement according to said sharpness enhancement value or noise suppression according to said noise suppression value, depending on an output from said selection unit.

12. The electronic apparatus according to claim 11, wherein said pre-processing unit includes:

a plurality of second filters each for obtaining a difference between said first filtered value of said target pixel and said first filtered value of one of said neighboring pixels;

a corresponding plurality of comparators respectively electrically coupled to said second filters, each for deciding whether to output said difference according to a predetermined threshold; and an adder electrically coupled to said corresponding plurality of comparators for generating a summation of said differences outputted from said corresponding plurality of comparators.

13. The electronic apparatus according to claim 12, wherein each of said differences is outputted for summation only if a corresponding one of said corresponding plurality of comparators determines that said each difference is larger than said predetermined threshold.

14. The electronic apparatus according to claim 12, wherein said sharpness control unit adjusts said summation value to generate said sharpness enhancement value according to an adjustment curve, and said adjustment curve provides a linear adjustment according to the equation $y=wx$, wherein w is a controllable parameter.

* * * * *